(12) United States Patent
Andersson et al.

(10) Patent No.: US 9,145,073 B2
(45) Date of Patent: Sep. 29, 2015

(54) COLLAPSIBLE BOLSTER CUSHION

(75) Inventors: Christer Andersson, Trollhattan (SE); Odd Jaegtnes, Nygård (SE)

(73) Assignee: LEAR CORPORATION, Southfield, MI (US)

( * ) Notice: Subject to any disclaimer, the term of this patent is extended or adjusted under 35 U.S.C. 154(b) by 599 days.

(21) Appl. No.: 13/048,157

(22) Filed: Mar. 15, 2011

(65) Prior Publication Data

US 2012/0235458 A1    Sep. 20, 2012

(51) Int. Cl.
*A47C 7/14* (2006.01)
*B60N 2/30* (2006.01)
*A47C 7/34* (2006.01)
*A47C 7/35* (2006.01)
*B60N 2/44* (2006.01)

(52) U.S. Cl.
CPC ............... *B60N 2/3011* (2013.01); *A47C 7/34* (2013.01); *A47C 7/345* (2013.01); *A47C 7/35* (2013.01); *B60N 2/449* (2013.01)

(58) Field of Classification Search
USPC ........................................... 297/284.9, 284.8
See application file for complete search history.

(56) References Cited

U.S. PATENT DOCUMENTS

| | | | |
|---|---|---|---|
| 4,337,279 A | 6/1982 | Polak | |
| 4,620,336 A | 11/1986 | Miller | |
| 4,654,905 A | 4/1987 | Miller | |
| 4,771,995 A | 9/1988 | Wells et al. | |
| 4,938,529 A * | 7/1990 | Fourrey | 297/284.9 |
| 5,052,064 A | 10/1991 | Hagemeister et al. | |
| 5,346,188 A | 9/1994 | Rodgers et al. | |
| 5,539,944 A | 7/1996 | Miller | |
| 5,622,357 A | 4/1997 | Schulz, Jr. et al. | |
| 5,765,240 A | 6/1998 | Workman | |
| 5,896,604 A * | 4/1999 | McLean | 5/690 |
| 6,012,190 A | 1/2000 | Rogers | |
| 6,032,307 A | 3/2000 | Workman | |
| 6,056,360 A * | 5/2000 | Schneider | 297/284.4 |
| 6,616,239 B2 | 9/2003 | Guillot | |
| 6,736,459 B1 | 5/2004 | Sturt | |
| 6,860,561 B2 | 3/2005 | Takata | |
| 6,874,840 B2 | 4/2005 | Neale | |
| 7,086,700 B2 * | 8/2006 | Habedank | 297/378.1 |
| 7,100,989 B2 | 9/2006 | Andersson et al. | |
| 7,108,323 B2 * | 9/2006 | Welch et al. | 297/284.9 |
| 7,137,664 B2 * | 11/2006 | McMillen et al. | 297/284.4 |
| 7,140,681 B2 * | 11/2006 | McMillen | 297/284.9 |
| 7,311,358 B2 * | 12/2007 | White et al. | 297/284.9 |

(Continued)

FOREIGN PATENT DOCUMENTS

| EP | 182944 A1 | 6/1986 |
|---|---|---|
| EP | 0192890 A2 | 9/1986 |

*Primary Examiner* — David E Allred
(74) *Attorney, Agent, or Firm* — Brooks Kushman P.C.

(57) ABSTRACT

A collapsible bolster cushion for a collapsible seat is provided. The collapsible bolster cushion includes a first support member that is attachable to a seat bottom or a seat back and a second support member. A separator element is disposed between the first and second support members. The separator element is movable between a first orientation and a second orientation such that in the first orientation, the separator element resiliently biases a portion of the second support member away from the first support member, and when the separator element is in the second orientation, the portion of the second support member is permitted to collapse toward the first support member to allow the seat to collapse to the folded position. An actuator moves the separator element between the first and second orientations.

20 Claims, 3 Drawing Sheets

(56) References Cited

U.S. PATENT DOCUMENTS

| | | |
|---|---|---|
| 7,406,727 B2 | 8/2008 | Wickstrom et al. |
| 7,461,895 B2 * | 12/2008 | Holdampf et al. ......... 297/284.9 |
| 7,726,739 B2 * | 6/2010 | Wain .......................... 297/284.9 |
| 7,909,403 B2 * | 3/2011 | Lawall et al. .............. 297/284.9 |
| 7,967,382 B2 * | 6/2011 | Pyun et al. ................. 297/284.9 |
| 8,020,933 B2 * | 9/2011 | Kim et al. .................. 297/284.9 |
| 2004/0140700 A1 * | 7/2004 | McMillen et al. .......... 297/284.4 |
| 2004/0140705 A1 * | 7/2004 | McMillen et al. ......... 297/378.1 |
| 2005/0093355 A1 * | 5/2005 | Habedank .................. 297/284.9 |
| 2006/0103214 A1 * | 5/2006 | Andersson et al. ...... 297/378.13 |
| 2006/0267382 A1 * | 11/2006 | McMillen et al. ............. 297/115 |
| 2006/0273644 A1 * | 12/2006 | Sturt et al. ................. 297/284.9 |
| 2008/0255733 A1 * | 10/2008 | McMillen et al. .............. 701/49 |
| 2009/0322133 A1 * | 12/2009 | Yamada et al. ............ 297/284.9 |
| 2010/0045087 A1 * | 2/2010 | Pyun et al. ................. 297/284.9 |

* cited by examiner

COLLAPSIBLE BOLSTER CUSHION

TECHNICAL FIELD

The present disclosure relates to collapsible cushions, and in particular to collapsible bolster cushions in a vehicle seat.

BACKGROUND

As vehicles become smaller and more compact, there is an increasing demand to devise ways of increasing the storage capacity of such vehicles. For example, some vehicles have seats which may fold to provide additional storage room, however the seat still extends above the floor of the vehicle and takes up vertical cargo room. Other vehicles include stowable seats which are the fold-and-tumble type and can sometimes be removed from the vehicle. The seat back of such a seat may fold forward and then the entire seat assembly may be tipped upward and forward and rests against the backs of the front seats. This provides even more cargo space, but the seat still takes up some fore-aft cargo room.

A collapsible seat decreases the amount of space such seat occupies when the seat is folded and stowed. One example of a seat having a collapsible cushion is illustrated in U.S. Pat. No. 7,100,989.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicle consumers want more comfortable seats, even for passengers seated in rear seats such as the second and third row of seats. Comfortable seats often include bigger and more stylish bolsters, such as in many high-end and performance vehicles. But bolsters that are substantial enough to make a passenger feel secure and comfortable in their seat also present some challenges, especially in rear seats that must be able to fold, split, stow away and/or be removable.

Figure 1:
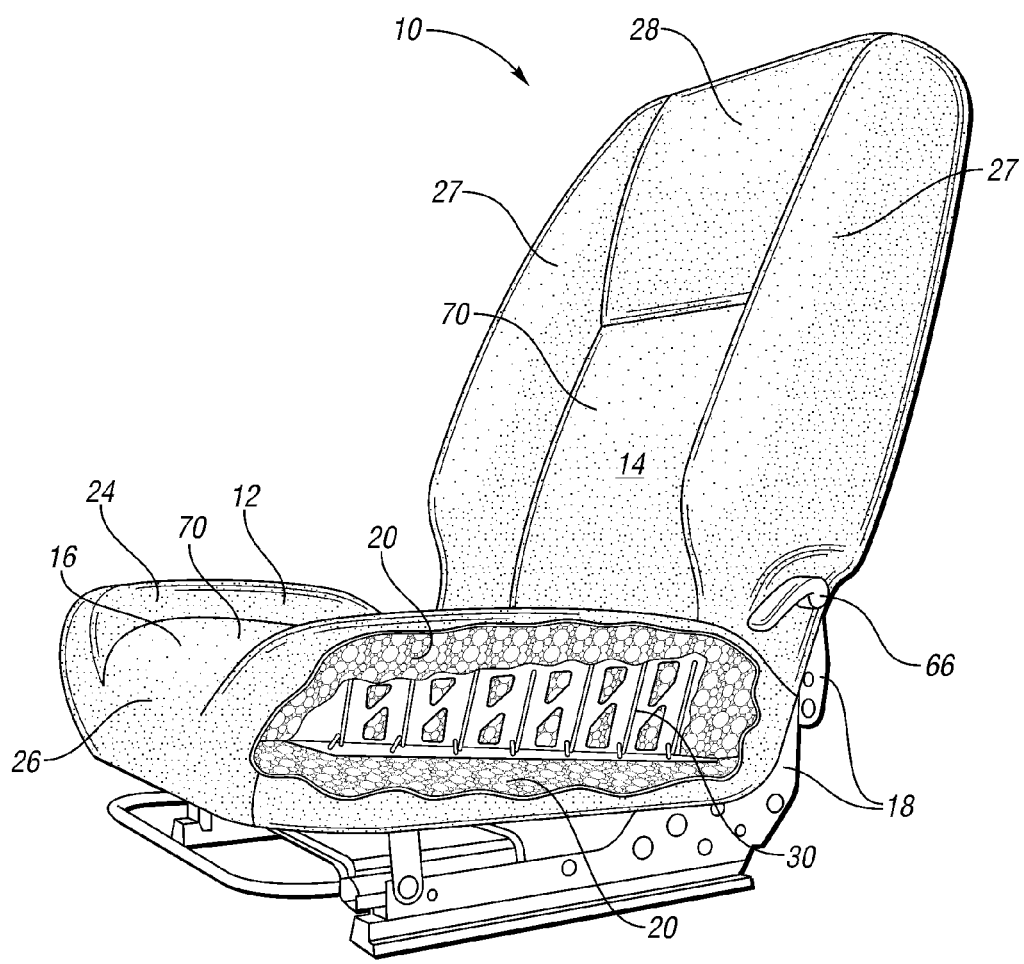
FIG. 1 is a perspective view of the a collapsible seat having a plurality of collapsible cushions according to an embodiment of the disclosure, including a cut-away view of one of the collapsible cushions.

Referring now to the Figures, FIG. 1 illustrates a vehicle seat assembly 10 having a collapsible bolster cushion 12 according to one aspect of the disclosure. FIG. 1 illustrates a bucket-style vehicle seat assembly 10 contoured to hold one person, although the collapsible bolster cushion 12 may be suitable for use with any type vehicle seat to permit localized folding and/or collapsing of the collapsible cushion 12.

Vehicle seat assembly 10 includes a seat back 14 and a seat bottom 16. The seat back 14 and seat bottom 16 may be of various constructions but each generally includes a seat frame 18 which is covered by foam cushioning 20 and trim material 22 and/or the seat back 14 and seat bottom 16 secured to the floor or any other suitable support structure of the passenger vehicle. The seat back 14 may be pivotally mounted to the seat bottom 16 to permit the passenger to adjust the seat back 14 relative to the seat bottom 16 or to allow the seat back 14 to be folded in a storage position.

For example, vehicle seat assembly 10 may include a pivot assembly (not shown) to which the seat back 14 and the seat bottom 16 are attached thereby allowing the seat back 14 and seat bottom 16 to pivot with respect to each other about pivot assembly. The pivot assembly can be fixed to the seat frame 18, the seat back 14 and seat bottom 16, or any other suitable component of the seat back 14 and seat bottom 16, such as brackets connected to the frame 18.

The vehicle seat assembly 10 may include a plurality of bolster cushions 12. As illustrated, the seat bottom 16 may include a pair of side bolsters cushions 24 to provide a passenger with lateral support when seated. While only two side bolsters are illustrated, any number of side bolsters is contemplated. For example, a rear seat in a vehicle may be contoured for several passengers, and may have several side bolsters. In another embodiment, the seat bottom 16 may also include a front bolster (not pictured) to provide support to a passenger's thighs when seated. The front bolster may be located between side bolster cushions 24 or extend along a front portion 26 of the vehicle seat assembly 10.

As further illustrated by FIG. 1, the seat back 14 may also include a pair of side bolsters cushions 27. Additionally, the seat back 14 may include a top bolster 28 located along the top portion of the seat back 14 when the seat back 14 is in an upright position. The side bolster cushions 24, 27 may have a generally be triangular-shaped cross-section, while the top bolsters 28 or front bolster may have a generally square/rectangular, or another suitable shape cross-section. It is also contemplated that the vehicle seat assembly 10 may include other bolsters or raised seating areas of various shapes which include collapsible cushions 12 according to an embodiment of the present disclosure.

A portion of the vehicle seat assembly 10 in FIG. 1 is cut-away to show the internal construction of the collapsible bolster cushion 12 in greater detail. The collapsible bolster cushion 12 includes a collapsible support structure 30. As illustrated, the collapsible support structure 30 may be located between cushioning layers 20. The cushioning layers 20 on top and below the collapsible support structure 30 may provide suspension and cushioning for the passenger along the collapsible bolster portion 12. In another embodiment, the collapsible support structure 30 may be spring biased in order to provide additional suspension and comfort.

The collapsible support structure 30 may be secured and held in place by the trim material 22 which is secured over the cushioning 20. The trim material 22 may be secured to the cushioning 20 and the vehicle seat assembly 10 with any suitable mechanism or method for securing trim material. The trim material 22 may include fabric, leather, vinyl or any other suitable trim material. As another example, the collapsible support structure 30 may be integrally molded into the cushioning 20 or held in place with any suitable fastener mechanism or method. In another embodiment, the collapsible support structure 30 may be attached directly to the seat frame 18 of the seat back 14 or seat bottom 16. Alternatively, the collapsible support structure 30 may be integrally formed with the seat frame 18 or a portion of the seat back 14 or seat bottom 16.

Figure 2:
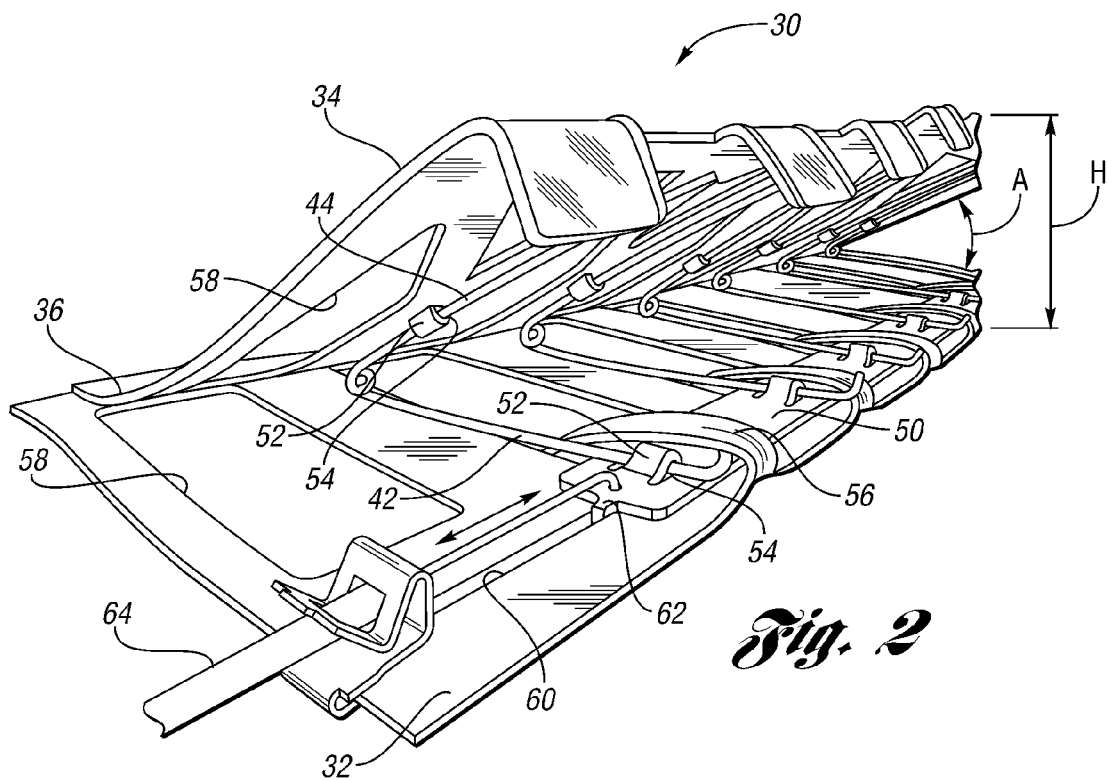
FIG. 2 is a side perspective view of a portion of the collapsible cushion from FIG. 1 in an extended position according to an embodiment of the disclosure.
Figure 3:
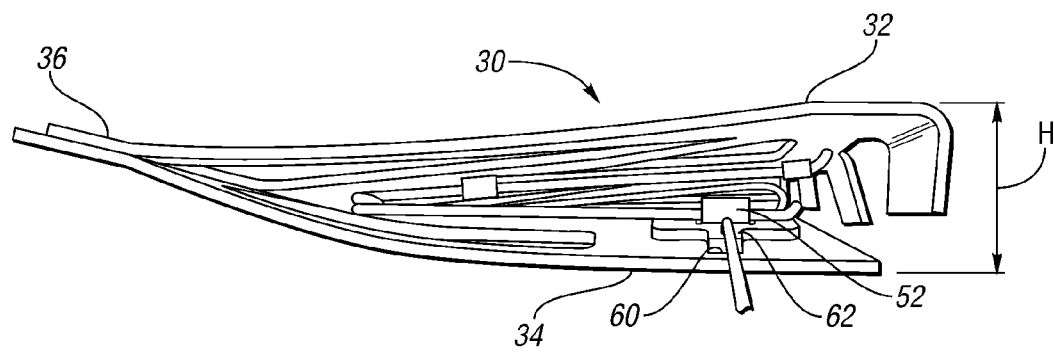
FIG. 3 is a side perspective view a portion of the collapsible cushion from FIG. 1 in a collapsed position according to an embodiment of the disclosure.

Referring now to FIG. 2 and FIG. 3, a collapsible support structure 30 according to one embodiment of the present disclosure is illustrated. The collapsible support structure 30 comprises first support member 32 and second support member 34. At least one separator element 40, such as a spring, a wire frame or other support element, is disposed between first support member 32 and second support member 34. As illustrated, the first support member may be a bottom support member 32 and the second support member may be a top support member, 34; however, the support members 32, 34 may be arranged in any suitable orientation.

The first support member 32 and the second support member 34 may be formed of plastic material, or any other suitable material such as stamped metal, for example. In one embodiment, the first support member 32 may be somewhat flexible in order to at least partially conform to a person seated on the collapsible bolster cushion 12.

In the embodiment illustrated in FIGS. 2 and 3, the first support member 32 and the second support member 34 are joined to each other along at least one side of each of the support members 32, 34, such that the collapsible bolster cushion 12 may have a generally triangular cross-section. The first support member 32 and the second support member 34 may be joined with fasteners, heat staked, or joined with any suitable fastening mechanism or method. In another embodiment, the first support member 32 and the second support member 34 may be integrally formed as one piece.

The first support member 32 and the second support member 34 may be hingedly joined to each other along a hinge area 36 so that the first support member 32 and the second support member 34 may move with respect to each other. When first support member 32 and second support member 34 are at a first extended orientation, as illustrated in FIG. 2, the first support member 32 and the second support member 34 are at an acute angle, A, relative to each other. This orientation may be the fully extended position, such that the separator element 40 is in an extended orientation and keeps the support member 32, 34 separated from each other.

FIG. 3 illustrates a collapsed orientation when the collapsible cushion 12 is in the fully folded or collapsed position. In the collapsed position, the height, H, of the collapsible cushion 12 is less than the height of the collapsible cushion 12 in the extended position. Likewise, in the collapsed folded position, the first support member 32 and the second support member 34 form an angle A less than the angle at the fully extended position.

The collapsible support structure 30 may include a plurality of separator element 40. Each separator element 40 is rotatable with respect to both the first support member 32 and the second support member 34. The separator element 40 may be a rigid element such as a closed frame shape formed of metal wire frame. For example, the separator element 40 may be a rigid triangular-shaped element for positioning the first member 32 away from the second support member 34. In another embodiment, the separator element 40 may be an elastic element for resiliently biasing the first member 32 away from the second support member 34. For example, as illustrated in FIG. 2-3, the separator element 40 may be a spring.

As illustrated in more detail in FIGS. 2-3, the separator elements 40 may be substantially planar springs. Planar springs may be utilized since the collapsible bolster cushion 12 collapses by a folding motion in which the springs 40 pivot in the same direction. In another embodiment, each separator element 40 may be like a safety-pin spring having a safety-pin coil 46 between a first leg 42 and a second leg 44. The safety-pin coil 46 may be located adjacent the hinged area 36 between the first support member 32 and the second support member 34. Like a safety-pin, the spring force of the safety-pin spring 140 is a spring force in a direction perpendicular to the axis of the safety-pin coil 46 thereby keeping the first support member 32 and the second support member 34 in a normally extended position.

Each separator element 40 may be arranged so that in the expanded orientation the first leg 42 is adjacent the first support member 32 and the second leg 44 is adjacent the second support member 34. Additionally, the first leg 42 may be generally parallel to the first support member 32 and the second leg 44 may be generally parallel to the second support member 34. When the separator element 40 is moved to the collapsed orientation, both the first leg 42 and second leg 44 may be generally parallel to the second support member 34 such that the spring force is parallel to the first support member 32 and the second support member 34.

In one embodiment, a plurality of separator elements 40, such as springs, are arranged into a row. Arrangement of the springs 40 into a row allows for the springs 40 to be efficiently packed and coordinated when pivoting of the springs 40 during folding of collapsible cushion 12. The springs 40 may be spaced apart so that when the springs 40 are rotated and folded, the springs 40 do not overlap with each other and lay primarily parallel to the first support member 32 and the second support member 34.

Although the separator element 40 primarily causes the bolster cushion to collapse by rotating and folding, where the separator element 40 is a spring some amount of compression may also be present to aid in reducing the size of collapsible cushion 12 when folded. The number and strength of the springs 40 may be arranged based on the load in the portion of the vehicle seat assembly 10 and a designated amount of compression.

The collapsible support structure 30 further includes a slider plate 50 for actuating the separator elements 40. As illustrated, the slider plate 50 is attached along the bottom support member 32. However, it is contemplated that the slider plate 50 may be attached to either the first support member 32 or the second support member 34. The slider plate 50 slides in a linear direction with respect to the first support member 32 to which the slider plate 50 is connected. The slider plate 50 is also connected to the separator element 40. By sliding the slider plate 50 in a linear direction along a plane of the first support member 32 the slider plate 50 moves the spring 40 between the first expanded position and a second collapsed position. The slider plate 50 may be formed of a material which is the same as the support members 32, 34 such as plastic or stamped metal. However, the slider plate 50 may be formed of any suitable material which allows slideable movement along the first support member.

As illustrated in FIGS. 2 and 3, the separator element s 40 may be connected to the slider plate 50 and the second support member 34. Guides 52 attach the plurality of separator elements 40 to the slider plate 50 and second support member 34 such that each separator element 40 is able to pivot relative to first support member 32 and second support member 34. The guides 52 allow the separator element 40 to pivot because the guides 52 have an opening 54 through which a portion of the separator element 40 passes which affixes the spring 40 to guides 52. Guides 52 may be attached the second support member 34 or the slider plate 50 by any suitable fastening mechanism. For example, guides 52 may snap into the support members 32, 34 and slider plate 50 or may be attached by heat staking. Alternatively, the guides 52 may be integrally formed, such as with heat forming in the support members 32, 34 and slider plate 50.

The slider plate 50 may be similarly attached with braces 56 to the first support member 32 or the second support member 34 so that the slider plate 50 can slidably move in relation to the first support member 32. The braces 56 may be integrated into the first support member 32. The braces 56 may extend up and over the slider plate 50 and extend through a cut-out 58 formed in the first support member 32. The slider plate 50 may be further connected with the first support member 32 along a track 60. The track 60 may be a groove or cut-out opening in the first support member 32 along which the slider plate 50 may translate. The slider plate 50 may further include a protrusion 62 which is adapted to be inserted into the track 60 in order to guide the slider plate 50 in a linear direction along the track 60.

The movement of the slider plate 50 is guided by braces 56 and track 60. When the collapsible structure 30 is folded, as demonstrated in FIG. 3, slider plate 50 is moved towards the seat back 14. The slider plate 50 may be slid back when seat back 14 is pivoted forward toward the seat bottom 16. The slider plate 50 may be operatively connected to the pivot assembly by a cable 64, such as a Bowden cable. The cable 64 may be pulled or released when the seat back 14 is pivoted about the pivot assembly, the seat back thereby acting as a release mechanism 66. Alternatively, the cable 64 may be operatively connected to a separate release mechanism such as a hand operated lever or any other release mechanism 66, located on the vehicle seat assembly 10 as shown FIG. 1, which may be manually operated by a passenger. The cable 64 may also be connected to a release mechanism 66 such as an electric motor (not shown) or any other device adapted to be used as a release mechanism 66 to activate the cable 64.

When the release mechanism 66 is actuated, the cable 64 may be pulled thereby sliding the slider plate 50 along the first support member 32. As the slider plate 50 moves, the leg 44 of the separator element 40 which is attached to the slider plate 50 moves in the same direction. The other leg 42 of the separator element 40 is rotatably secured to the other of the second support member 34 so that as the first leg 42 of the spring 40 slides with the slider plate 50, the spring 40 begins to rotate and fold in a direction opposite of the movement of the slider plate 50 thereby pulling the second support member 34 downward as the second leg 44 of the separator element 40 folds towards the first support member 32. As the separator element 40 is tilted sideways in a direction opposite, the support members 32, 34 are moved to a compressed orientation. In the compressed orientation, the support member 32, 34 may be are generally parallel to each other. In the compressed orientation, the collapsible bolster cushion 12 is collapsed and flattened out.

The slider plate 50 may be spring loaded so that the slider plate 50 slides in the opposite direction automatically when the release mechanism 66 is disengaged or the seat back 14 is pivoted upright. Alternatively, the cable 64 may push the slider plate 50 in the opposite direction. In another embodiment, a second actuator may be attached to a second end of the slider plate (not shown). For example, a second cable may be attached to a second end of the slider plate 50 so that the second cable is actuated to return the collapsible bolster cushion 12 to the expanded position.

Referring back to FIG. 1, the vehicle seat assembly 10 may also include a central cushion portion 70. The collapsible bolster cushion 12, including side bolster cushions 24, front bolster cushions or top bolster cushions 28, are collapsible so that in a collapsed position a top surface of the collapsible bolster cushions 12 is at least level with a top surface of the non-collapsible central cushion portion 70 or does not extend above the top surface of the non-collapsible central cushion portion 70. The height H of each collapsible bolster cushion 12 in the collapse position is less than the height of the collapsible bolster cushion 12 in the extended position.

The central cushion portion 70 may be a collapsible cushion or a non-collapsible cushion. In one embodiment, the central cushion portion 70 may be a collapsible cushion such as that described in U.S. Pat. No. 7,100,989 or any other suitable collapsible cushion. In another embodiment, the central cushion 70 may be a non-collapsible cushion portion.

Figure 4:
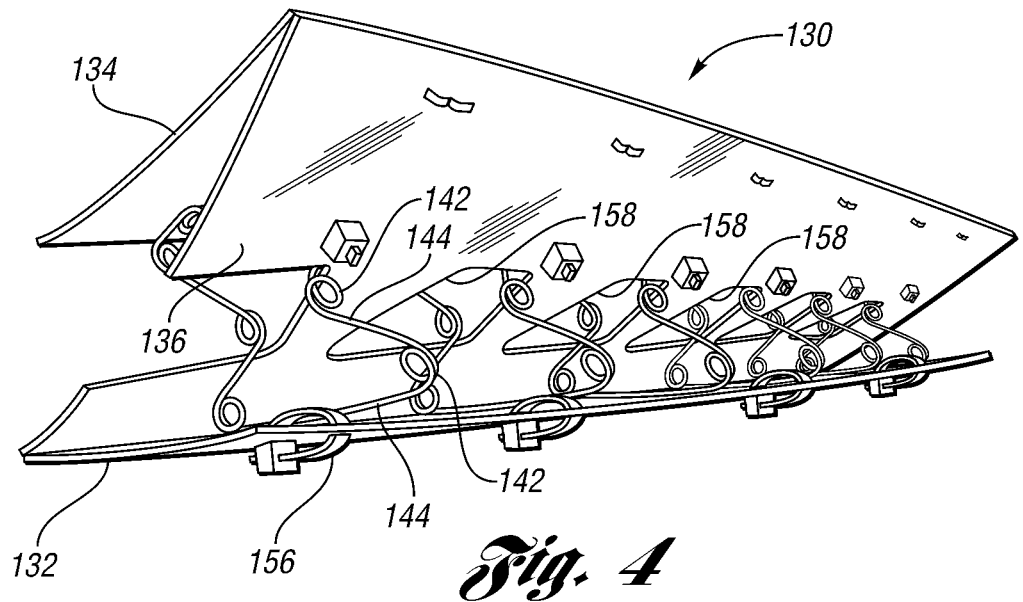
FIG. 4 is a perspective view of a collapsible cushion in an extended position according to an alternate embodiment of the disclosure.
Figure 5:
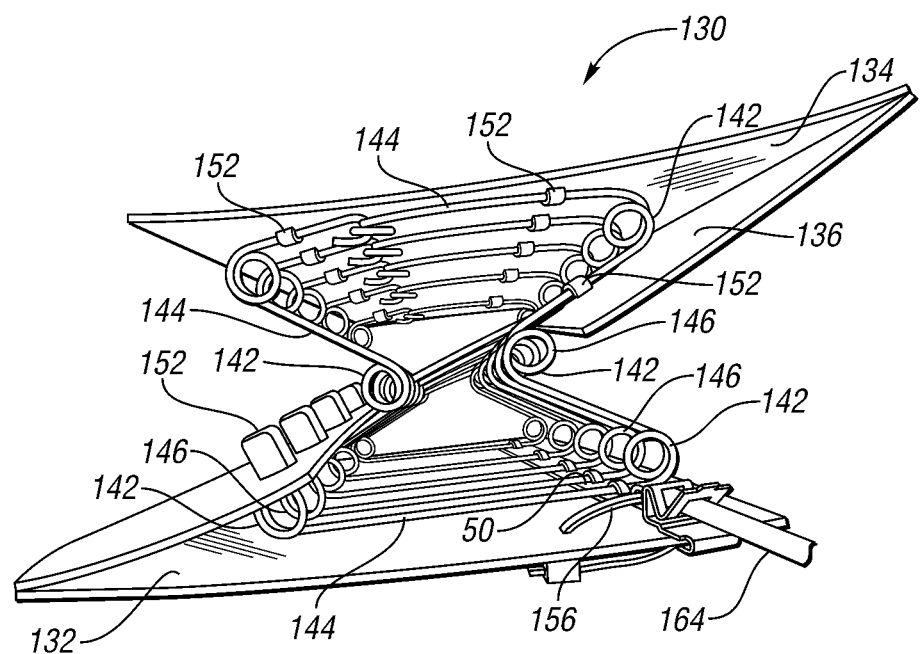
FIG. 5 is a side perspective view of a collapsible cushion in an extended position according to an alternate embodiment of the disclosure.

The embodiment illustrated in FIGS. 4 and 5 may be adapted for collapsible cushion areas which are square/rectangular in cross-section rather than triangular. As illustrated, collapsible support structure 130 includes first support member 132, a second support member 134, as well as a third support member 136. The first support member 132 and the second support member 134 may be joined to each other by the third support member 136 which extends diagonally between the first support member 132 and the second support member 134. The first support member 132 may be joined along at least one side to the third support member 136. Likewise, the second support member 134 may be joined along an opposite side to the third support member 136. The support members 132, 134, 136 may be joined with fasteners heat staked or joined in any suitable fastening mechanism or method. In another embodiment, the support members 132, 134, 136 may be integrally formed as a one-piece support member. The first support member 132 and the second support member 134 may be hingedly joined to the third support member 136 so that the first and second support members 132, 134 may move with respect to the third support member 136.

When the collapsible support structure 130 is in a first extended orientation as illustrated in FIGS. 4 and 5, the first and second support members 132, 134 may be generally parallel to each other while the first, second, and third support members 132, 134, 136 may form a generally Z-shaped support. As such, the third support member 136 is disposed at an acute angle A relative to the first support member 132 and the second support member 134

At least one separator element 140 extends between the first support member 132 and the second support member 134. Each separator element 140 extends between the first support member 132 and the second support member 134 such that a portion of each separator element 140 may extend through cut-outs 158 formed in the third support member 136.

The collapsible support structure 130 may include a plurality of separator elements 140. Each separator element 140 is formed with a plurality of folds or bends. For example, each separator element 140 may include bends 142. For each separator element 140, each of the bends 142 is substantially coplanar. Typically, each separator element 140 may have from two to ten bends 142, depending on the thickness of the collapsible bolster cushion 12. In other variations, each separator element 140 may have six bends, as illustrated in FIGS. 4 and 5.

In another embodiment, the separator element 140 may be formed like a spring, where each of the bends 142 may be formed like a safety-pin spring having a coil 146 at each of the bends 142. Like a safety-pin, the spring force of the spring 140 is in a direction perpendicular to the axis of the safety-pin coil 146.

The separator element 140 may include a plurality of sections 144 formed between each of the bends 142. The separator element 140 may be arranged so that a section 144 may extend adjacent the first support member 132. The section 144 may disposed be generally parallel to the first support member 132. In one embodiment, the plurality of separator elements 140 may be arranged in a row. The separator elements 140 may be spaced apart so that when the separator elements 140 are rotated and folded, the sections 144 do not overlap with each other and lay primarily parallel to the support members 132, 134, 136.

The collapsible support structure 130 further includes a slider plate 150 for actuating the separator elements 140. The slider plate 150 may be attached to the first support member 132 and move in a linear direction with respect to the support member 132. The slider plate 150 is also connected to the separator elements 140. By sliding the slider plate 150 in a linear direction along the plane of the first support member 132, the slider plate 150 moves the separator elements 140 between a first expanded position and the second collapsed position.

As illustrated in FIGS. 4 and 5, the separator elements 140 may be rotatably connected to the slider plate 150 and the second support member 134 with guides 152. The cut-outs 158 and the third support member 136 may be sized to allow the separator elements 140 to rotate and fold without interference. Likewise, the slider plate 150 may be attached to the first support member 132 with braces 156 which allow the slider plate 150 slide in relation to the first support member 132. The braces 156 may be integrated into the first support member 32. The braces 56 may extend up and over the slider plate 50 and extend through a cut-out 58 formed in the first support member 32. The movement of the slider plate 150 by a Bowden cable 164, or any other suitable actuator.

In a vehicle seat assembly 10 having a plurality of collapsible bolster cushions 12, the seat may have a plurality of collapsible support structures 30, 130 or any combination thereof depending on the vehicle seat assembly 10 design. It is contemplated that each collapsible support structure 30, 130 may include an actuator such as cables 64, 164. However, the plurality of cables 64, 164 may be actuated by a single release mechanism 66, such as folding the seat back or actuating release lever 66.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A collapsible seat comprising:
a seat bottom;
a seat back movable relative to the seat bottom to collapse the seat to a folded position; and
at least one collapsible bolster cushion disposed on one of the seat back or the seat bottom, the collapsible bolster cushion comprising:
a support member that is attachable to the seat bottom or seat back, wherein the support member includes first and second support members attached to pivot at an expanded angle relative to each other;
a spring element disposed between the first and second support members, the spring element being movable between a first orientation and a second orientation, wherein in the first orientation, the spring element resiliently biases the first support member away from the seat bottom or seat back, and when the spring element is in the second orientation, the first support member is permitted to collapse toward the seat back or seat bottom to allow the seat to collapse to the folded position; and
an actuator operatively connected to the spring element for moving the spring element between the first and second orientations,
wherein the spring element comprises a safety-pin spring having first and second spring legs positioned at an angle relative to each other such that when the spring element is in the first orientation, the first and second spring legs are generally parallel to and adjacent to the first and second support members, respectively with the first and second spring legs not parallel to each other, thereby exerting a spring force to bias the first and second support members at the expanded angle.

2. The collapsible seat of claim 1 wherein in the first orientation, the spring element has a spring force being generally perpendicular to the first and second support members, and wherein in the second orientation, the spring force is not perpendicular to the first and second support members.

3. A collapsible seat comprising:
a seat bottom comprising:
a non-collapsible cushion, wherein a top surface of the non-collapsible cushion forms a seating surface of the seat bottom;
a plurality of collapsible bolster cushions movable between a first extended position and a second collapsed position, wherein each of the collapsible bolster cushions includes a spring element to resiliently bias the collapsible bolster cushions to the first extended position; and
wherein each spring element comprises a safety-pin spring each having first and second spring legs positioned at an angle relative to each other such that when the spring element is in a first orientation, the first and second spring legs are generally parallel to and adjacent to a first support member and a second support member of the bolster cushion, respectively with the first and second spring legs not parallel to each other, thereby exerting a spring force to bias the bolster cushion to the extended position,
a release mechanism operatively connected to the plurality of collapsible bolster cushions; and
wherein each of the collapsible bolster cushions has a first height in the first extended position where a top surface of each of the collapsible bolster cushions extends beyond the seating surface of the non-collapsible cushion, and when the release mechanism is actuated each collapsible cushion portion moves to the second collapsed position having a second height less than the first height.

4. The collapsible seat of claim 3 wherein each of the spring elements comprises a safety-pin spring having a coil bend disposed between a first spring leg and a second spring leg.

5. The collapsible seat of claim 3 wherein the spring element is rotatably attached to the each of the collapsible bolster cushions, such that when the release mechanism is actuated, the spring element rotates to move each of the collapsible bolster cushions to the second collapsed position.

6. The collapsible seat of claim 5 wherein the spring element is rotatable between the first orientation and a second orientation.

7. The collapsible seat of claim 3 wherein each of the collapsible bolster cushions includes a first support member pivotally joined to a second support member so that the first support member pivots at an angle relative the second support member.

8. The collapsible seat of claim 7 wherein the spring element is disposed between the first support member and the second support member.

9. The collapsible seat of claim 3 wherein each of the spring elements is rotatable between first and second orientations and in the first orientation, each of the spring elements has a spring force being generally perpendicular to the first and second support members.

10. A collapsible seat comprising:
a seat bottom;
a seat back movable relative to the seat bottom to collapse the seat to a folded position; and
a bolster cushion disposed on one of the seat back or the seat bottom and movable between an expanded position and a collapsed position, the bolster cushion comprising:
   a bolster panel having first and second support members attached to pivot at an expanded angle relative to each other;
   a spring element defined by a safety-pin spring having at least one spring coil connected between first and second spring legs positioned at an angle relative to each other such that the spring element has a spring force, the spring element disposed between the first support member and the second support member such that the first spring leg is rotatably connected to the first support member and the second spring leg is rotatably connected to the second support member; and
   an actuator operatively connected to the spring element for moving the spring element between a first and a second orientations,
when the spring element biases the bolster cushion to the expanded position, when the spring element is in the first orientation and the first and second spring legs are generally parallel to and adjacent to the first and second support members, respectively with the first and second spring legs not parallel to each other, and the spring force is thereby generally perpendicular to the first and second support members, respectively when the first and second support members are pivoted at the expanded angle, and
wherein the first support member is permitted to collapse toward the second support member to move the bolster cushion to the collapse position when the actuator moves the spring element to the second orientation, thereby allowing the seat to collapse to the folded position.

11. The collapsible seat of claim 10 wherein the actuator is slidably attached to the first support member, the spring element thereby being rotatably attached between the actuator and the second support member.

12. The collapsible seat of claim 11 wherein in the second orientation, the spring force is not perpendicular to the first and second support members.

13. The collapsible seat of claim 10 wherein the spring element includes a plurality of springs disposed between the first support member and the second support member.

14. The collapsible seat of claim 10 wherein the actuator includes a sliding plate that is moveable in a linear direction along a plane of the first support member, wherein movement of the sliding plate in the linear direction along the plane of the first support member moves the first spring leg thereby rotating the spring element so that the second spring leg moves towards the first support member, thereby also moving the second support member towards the first support member in order to collapse the bolster cushion.

15. The collapsible seat of claim 14 wherein the actuator includes a Bowden cable connected to the sliding plate.

16. The collapsible seat of claim 10 wherein the actuator includes a sliding plate that is moveable in a linear direction along a plane of the first support member, wherein movement of the sliding plate in the linear direction along the plane of the first support member moves the first leg of the safety-pin spring, thereby rotating the safety-pin spring so that the second leg of the safety-pin spring moves towards the first support member, thereby also moving second support member towards the first support member in order to collapse the bolster cushion.

17. The collapsible seat of claim 16 further comprising a Bowden cable connected to the sliding plate.

18. The collapsible seat of claim 17 further comprising a release mechanism operatively connected to the sliding plate via the Bowden cable and disposed on the seat back or the seat bottom, the release mechanism being adapted for actuating the actuator to thereby collapse the bolster cushion.

19. The collapsible seat of claim 18 wherein the release mechanism actuates the actuator thereby moving the spring element from the first orientation to the second orientation so that when the seat back is pivoted to the folded position the bolster cushion is collapsed, thereby allowing the seat to be compactly folded.

20. The collapsible seat of claim 10 wherein the spring element is rotatable between the first and second orientations.

* * * * *